(12) United States Patent
Campbell et al.

(10) Patent No.: US 11,121,430 B2
(45) Date of Patent: Sep. 14, 2021

(54) BLOCK COPOLYMER SEPARATORS WITH NANO-CHANNELS FOR LITHIUM-ION BATTERIES

(71) Applicants: Chongqing Jinkang New Energy Automobile Co., Ltd., Chongqing (CN); SF Motors Inc., Santa Clara, CA (US)

(72) Inventors: Brennan Campbell, Santa Clara, CA (US); Scott Monismith, Santa Clara, CA (US); Yifan Tang, Santa Clara, CA (US); Ying Liu, Santa Clara, CA (US)

(73) Assignees: Chongqing Jinkang New Energy Automobile Co., Ltd., Chongqing (CN); SF Motors Inc., Santa Clara, CA (US)

( * ) Notice: Subject to any disclaimer, the term of this patent is extended or adjusted under 35 U.S.C. 154(b) by 63 days.

(21) Appl. No.: 16/293,615

(22) Filed: Mar. 5, 2019

(65) Prior Publication Data
US 2020/0287188 A1   Sep. 10, 2020

(51) Int. Cl.
| | |
|---|---|
| *H01M 2/14* | (2006.01) |
| *H01M 50/411* | (2021.01) |
| *H01M 4/131* | (2010.01) |
| *H01M 10/39* | (2006.01) |
| *C08L 25/12* | (2006.01) |
| *H01M 10/0525* | (2010.01) |
| *H01M 50/46* | (2021.01) |

(Continued)

(52) U.S. Cl.
CPC ........... *H01M 50/411* (2021.01); *B01D 71/26* (2013.01); *B01D 71/28* (2013.01); *B01D 71/40* (2013.01); *B01D 71/42* (2013.01); *C08L 25/12* (2013.01); *H01M 4/131* (2013.01); *H01M 10/0525* (2013.01); *H01M 10/3963* (2013.01); *H01M 50/46* (2021.01); *H01M 50/463* (2021.01); *B82Y 40/00* (2013.01)

(58) Field of Classification Search
CPC .... H01M 1/1653; H01M 1/1673; H01M 1/18; H01M 10/0525; H01M 10/3963; B01D 71/13; B01D 71/19; B01D 71/26; B01D 71/28; B01D 71/40; B01D 71/42
See application file for complete search history.

(56) References Cited

U.S. PATENT DOCUMENTS 6,565,763 B1 *   5/2003   Asakawa ............... C03C 17/007
                                                      216/56
6,830,849 B2 * 12/2004   Lee ........................ B01D 39/16
                                                      429/249

(Continued)

*Primary Examiner* — Amanda C. Walke
(74) *Attorney, Agent, or Firm* — Kilpatrick Townsend & Stockton LLP

(57) ABSTRACT

Embodiments disclosed herein generally relate to a microporous separator with a pore geometry that creates a low or no tortuosity architecture. In one embodiment, a battery cell may comprise of an anode layer, a cathode layer, and a separator layer positioned between the cathode layer and the anode layer. The separator layer may be comprised of one or more block copolymers. The block copolymers that make up the separator layer may be materials that self-align into a vertical nanostructure. The vertical nanostructures may allow ions within the battery cell to flow in a vertical path between the cathode and anode. This vertical path my create a low or no tortuosity environment within the battery cell.

18 Claims, 4 Drawing Sheets

(51) Int. Cl.
*H01M 50/463* (2021.01)
*B01D 71/26* (2006.01)
*B01D 71/28* (2006.01)
*B01D 71/40* (2006.01)
*B01D 71/42* (2006.01)
*B82Y 40/00* (2011.01)

(56) References Cited

U.S. PATENT DOCUMENTS

| | | | |
|---|---|---|---|
| 10,361,414 B2* | 7/2019 | Wong | H01M 2/166 |
| 2009/0208842 A1* | 8/2009 | Harada | H01M 2/1653 |
| | | | 429/209 |
| 2014/0178582 A1* | 6/2014 | Gaynor | B01D 71/80 |
| | | | 427/245 |
| 2015/0030933 A1* | 1/2015 | Goetzen | H01M 2/145 |
| | | | 429/231.95 |
| 2016/0325229 A1* | 11/2016 | Zhou | B01D 71/42 |
| 2016/0351876 A1* | 12/2016 | Jo | H01G 9/02 |
| 2017/0365882 A1* | 12/2017 | Luski | H01M 2/166 |
| 2019/0326579 A1* | 10/2019 | Ryu | H01M 10/0525 |
| 2020/0067136 A1* | 2/2020 | Naughton | H01M 2/1653 |

* cited by examiner

BLOCK COPOLYMER SEPARATORS WITH NANO-CHANNELS FOR LITHIUM-ION BATTERIES

BACKGROUND

Lithium ion (Li-ion) batteries may have a variety of applications. Devices from mobile phones to electronic vehicles (EV) may utilize Li-ion batteries as power sources. The rate capability of a Li-ion battery may be directly correlated to the rate of charging of the Li-ion battery and/or the rate of discharging of the Li-ion battery. Specifically, the rate capability may determine how quickly a Li-ion battery may be charged or discharged. A high rate capability may be essential in high power density applications such as powering a motor within an EV. Mass transport properties of a Li-ion battery may stymie a battery's rate capability. Mass transport properties may dictate the flow of the lithium ions within the Li-ion battery. The flow of electrons may be hindered by traditional microporous separators within Li-ion batteries. For example, many traditional microporous separators (such as plastic separators) may prevent Li-ion batteries from having high rate capabilities due to high ionic resistance which may be the result of high tortuosity within an Li-ion battery. Tortuosity may be a measure of a deviation of an ionic pathway from a straight line and may be closely associated with pore geometry of a microporous separator. The pore geometry may determine the trajectory of ionic conduction (e.g., the path lithium ions may take when moving from one electrode to another). Therefore, there is a need for a microporous separator with a pore geometry that creates a low or no tortuosity architecture that may allow lithium ions to flow in a straight one dimensional fashion.

BRIEF SUMMARY

This disclosure is generally related to a microporous separator with a pore geometry that creates a low or no tortuosity architecture. In one embodiment, a battery cell may comprise of an anode layer, a cathode layer, and a separator layer positioned between the cathode layer and the anode layer. The separator layer may be comprised of one or more block copolymers. The block copolymers that make up the separator layer may be materials that self-align into a vertical nanostructure. As a result, the pores of separator layer may be implemented by a plurality of these vertical nanostructures. The vertical nanostructures may allow ions within the battery cell to flow in a vertical path between the cathode and anode. This vertical path my create a low or no tortuosity environment within the battery cell.

In one embodiment, the vertical nanostructures may have a diameter between 1 nanometer and 100 nanometers. In one embodiment, the separator layer may be relatively thick with a thickness between 8 microns and 30 microns. A thick separator layer may be pivotal and preventing an internal short caused between the unintended touching of the anode and cathode. Such a thick separator is especially useful when the battery cell is utilized within an EV. In one embodiment the block copolymers that make up the separator layer may comprise acrylonitrile and/or polystyrene. In one embodiment, the separator layer may comprise a ratio of 1 part acrylonitrile and 3 parts polystyrene. The battery cell described herein may be implemented as a wet battery cell or a solid state battery cell.

Features, embodiments, and advantages of the present disclosure are better understood when the following Detailed Description is read with reference to the accompanying drawings.

DETAILED DESCRIPTION

Figure 1:
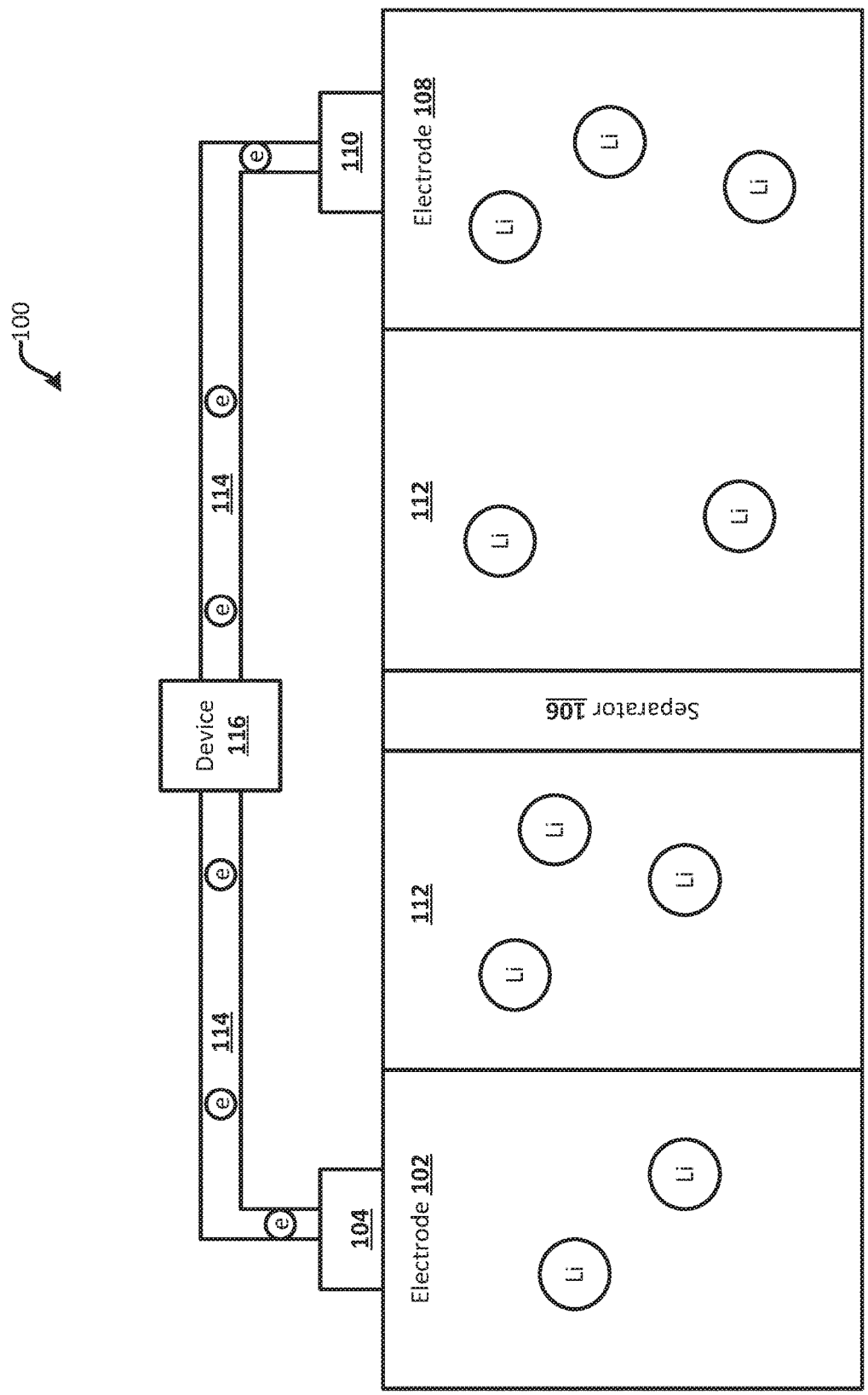
FIG. 1 depicts a first battery cell in accordance with one or more embodiments.

FIG. 1 depicts example cell 100 that may be implemented by one or more embodiments. Cell 100 may be a cell within a Lithium ion (Li-ion) battery. Cell 100 produces electrical energy from chemical reactions. Cell 100 may be repeatedly charged and discharged. Cell 100 may comprise electrode 102, terminal 104, separator 106, electrode 108, terminal 110, electrolyte 112 and electron path 114.

Electrode 102 may be a positive electrode (e.g., a cathode) comprised of different material types. For example, electrode 102 may be comprised of lithium-cobalt oxide (Li-CoO$_2$), lithium iron phosphate (LiFePO$_4$), lithium manganese oxide (LMO), lithium nickel cobalt aluminum oxide (NCA), lithium nickel manganese cobalt oxide (NMC), and/or another metal based alloy. Electrode 102 may, prior to the initiation of a charging process, contain a plurality of lithium ions. During the charging process, the lithium ions (e.g., positively charged lithium ions) within electrode 102 may flow, via electrolyte 112, through separator 106 to electrode 108. During a discharging process the opposite may take place and the lithium ions within electrode 108 may flow, via electrolyte 112, through separator 106 and back to electrode 102.

Terminal 104 may be a current collector attached to electrode 102. Terminal 104 may be comprised of various materials including, but not limited to, aluminum and/or aluminum based compounds. During a charging process, lithium ions within electrode 102 may flow from electrode 102 and electrons may be released. These electrons may flow from electrode 102 to terminal 104 and then from terminal 104, via electron path 114, to terminal 110. Because current flows in the opposite direction of electrons, terminal 104 may collect current during the charging process.

Separator 106 may separate electrode 102 and electrode 108 while allowing lithium ions to flow between electrode 102 and electrode 108. Separator 106 may be a microporous isolator with little to no electrical conductivity. Separator 106 may also prevent the flow of electrons within electrolyte 112. By preventing electrons to flow within electrolyte 112, separator 106 may force electrons to flow via electron path 114.

Electrode 108 may be a negative electrode (e.g., an anode) comprised of different material types. For example, electrode 108 may be comprised of carbon (e.g., graphite), cobalt, nickel, manganese, aluminum, and/or compounds including carbon, graphite, lithium titanium oxide (LTO), silicon, silicon oxide (SiO), SiO$_x$, tin, tin oxide (SnO$_2$), germanium, graphene, graphene oxide, cobalt, nickel, manganese, aluminum, and/or carbon nanotubes. Electrode 108 may, prior to the initiation of a charging process, contain none or a small amount of lithium ions. During the charging process, the lithium ions (e.g., positively charged lithium ions) within electrode 102 may flow, via electrolyte 112, through separator 106 and to electrode 108. During a discharging process, the opposite may take place and the lithium ions within electrode 108 may flow, via electrolyte 112, through separator 106 and to electrode 102.

Terminal 110 may be a current collector attached to electrode 108. Terminal 110 may be comprised of various materials including, but not limited to, copper, nickel, and/or compounds including copper and/or nickel. During a charging process, electrons may flow from electrode 102 to terminal 104 and then from terminal 104, via electron path 114, to terminal 110. Because current flows in the opposite direction of electrons, terminal 110 may collect current during a discharging process (e.g., when lithium ions flow from electrode 108 to electrode 102).

Electrolyte 112 may be a solution of solvents, salts, and/or additivities that acts as a transport medium for lithium ions. Lithium ions may flow between electrodes 102 and 108 via electrolyte 112. In one embodiment, when an external voltage is applied to one of or both of electrodes 102 and 108 the ions in electrolyte 112 are attracted to an electrode with the opposite charge. For example, when external voltage is applied to cell 100, the lithium ions may flow from electrode 102 to electrode 108. The flow of ions within electrolyte 112 is due to the fact that electrolyte 112 has a high ionic conductivity due to the material make up of electrolyte 112. Electrolyte 112 may be comprised of various materials such as ethylene carbonate (EC), dimethyl carbonate (DMC), lithium salts (e.g., $LiClO_4$, $LiPF_6$, LiTFSI, $LiNO_3$ and the like), fluoroethylene carbonate (FEC), vinylene carbonate (VC), and/or ethyl methyl carbonate (EMC). In one embodiment, one or more components (e.g. electrode 102, electrode 108, separator 106) of cell 100 may be soaked in electrolyte 112. In one embodiment, when cell 100 is a solid state battery electrolyte 112 may be a solid instead of a liquid.

Electron path 114 may be a path through which electrons flow between electrode 102 and electrode 108. Separator 106 may allow the flow of lithium ions between electrode 102 and electrode 108 via electrolyte 112, but separator 106 may also prevent the flow of electrons between electrode 102 and electrode 108 via electrolyte 112. Because the electrons cannot flow via electrolyte 112, they instead flow between electrode 102 and electrode 108 via electron path 114. In one embodiment, device 116 may be attached to electron path 114 and during a discharging process the electrons flowing through electron path 114 (from electrode 108 to electrode 102) may power device 116. In one embodiment, device 116 may only be attached to electron path 114 during a discharge process. In such an embodiment, during a charging process when an external voltage is applied to cell 100, device 116 may be directly powered or partially powered by the external voltage source.

Device 116 may be a parasitic load attached to cell 100. Device 116 may operate based at least in part off of power produced by cell 100. Device 116 may be various devices such as an electronic motor, a laptop, a computing device, a processor, and/or one or more electronic devices. Device 116 may not be a part of cell 100, but instead relies on cell 100 for electrical power. For example, device 116 may be an electronic motor that receives electric energy from cell 100 via electron path 114 and device 116 may convert the electric energy into mechanical energy to perform one or more functions such as acceleration in an EV. During a charging process, when an external power source is connected to cell 100, device 116 may be powered by the external power source (e.g., external to cell 100). During a discharging process, when an external power source is not connected to cell 100, device 116 may be powered by cell 100.

Figure 2:
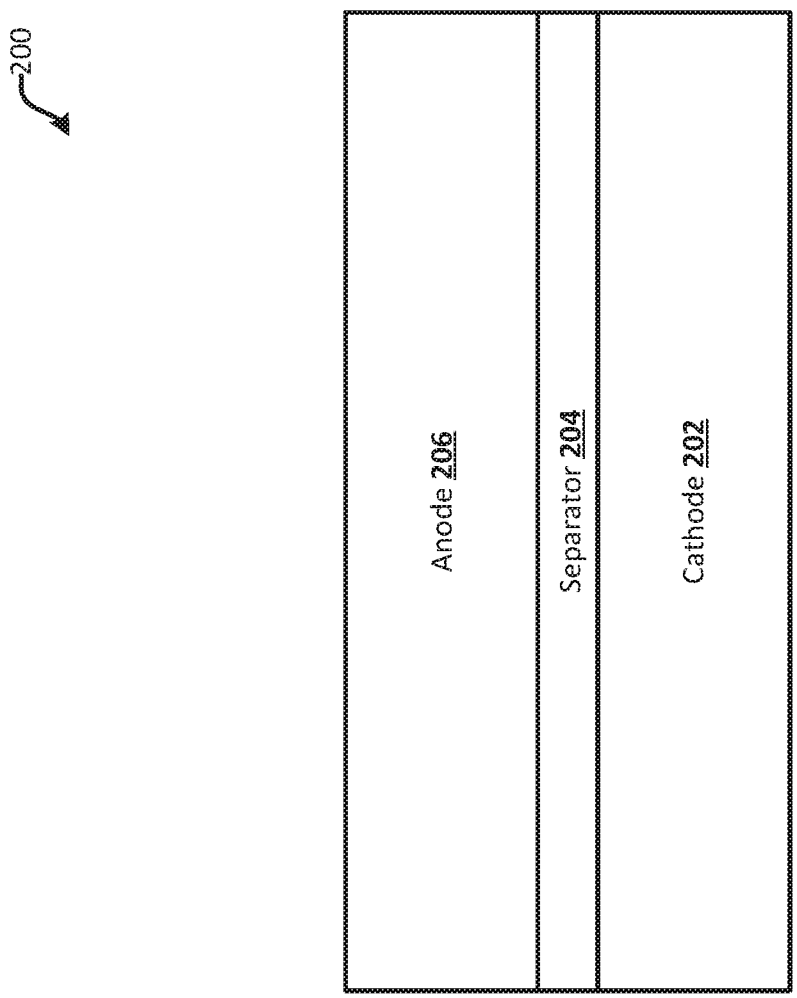
FIG. 2 depicts a second battery cell in accordance with one or more embodiments.

FIG. 2 illustrates cell 200 that may be implemented by one or more embodiments. Cell 200 comprises cathode 202, separator 204, and anode 206. Cathode 202 may be a positively charged electrode. Anode 206 may be a negatively charge electrode. Separator 204 may be a microporous insulator that physically separates cathode 202 and anode 206. Separator 204 may be comprised partly or solely of one or more block copolymers. A block copolymer is formed by two more homopolymer chains joined together through a covalent bond. Block copolymers may self-assemble and form different nanostructures depending on the properties of each block within the block copolymer. For example, a nanostructure may be cylinders or spheres. Thus, a block copolymer, depending on the blocks it is comprised of, may self-assemble into a cylinder nanostructure. A block may be a portion of a macromolecule. A macromolecule may be a polymerized monomer such as polystyrene comprising many constitutional units, that has at least one feature which may not be present in adjacent portions of the macromolecule. The block copolymers may be implemented on an electrode by various techniques including, but not limited to graphoepitaxy, chemoepitaxy. In one embodiment, separator 204 may be formed on cathode 202 or anode 206 my coating (e.g., spin coating) a combination of block polymers onto cathode 202 or anode 206. In one embodiment, separator 204 may comprise block copolymers that self-assemble into a vertical column (i.e. cylinder) nanostructure. In one embodiment, the following tables (Table 1 and Table 2) may comprise one or more sets of exemplary copolymers that may be utilized in various ratios to create separator 204.

TABLE 1

| Block Copolymer constituents (Aqueous dispersions) | |
| --- | --- |
| Anchor Polymer | Stabilizing moieties |
| Polystyrene | Poly (oxyethylene) |
| Poly (vinyl acetate) | Poly (vinyl alcohol) |
| Poly (methyl methacrylate) | Poly (acrylic acid) |
| Poly (acrylonitrile) | Poly (methacrylic acid) |
| Poly (dimethyl siloxane) | Poly (acrylamide) |
| Poly (ethylene) | Poly (vinyl pyrrolidone) |
| Poly (propylene) | Poly (ethylene imine) |
| Poly (lauryl methacrylate) | Poly (vinyl methyl ether) |
| Poly (vinyl chloride) | Poly (4-vinylpyridine) |

TABLE 2

| Block Copolymer constituents (Nonaqueous dispersions) | |
| --- | --- |
| Anchor Polymer | Stabilizing moieties |
| Poly (acrylonitrile) | Polystyrene |
| Poly (oxyethylene) | Poly (lauryl methacrylate) |
| Poly (ethylene) | Poly (12-hydroxystearic acid) |
| Poly (propylene) | Poly (dimethyl siloxane) |
| Poly (vinyl chloride) | Poly (isobutylene) |
| Poly (methyl methacrylate) | Cis-1:4-poly (isoprene) |
| Poly (acrylamide) | Poly (vinyl acetate) |
| | Poly (methyl methacrylate) |
| | Poly (vinyl methyl ether) |

In one embodiment, a first ratio of an anchor polymer from a table may be combined with a second ratio of a stabilizing moiety from the same table. For example, a 1:3 ratio of acrylonitrile-polystyrene may be used as a self-assembling block copolymer to make up separator 204. In one embodiment, the copolymers may be selected to produce a vertical cylinder nanostructure with each vertical cylinder in the nanostructure (i.e., nano channel) having a diameter of 1 nanometer to 100 nanometers. By producing a nanostructure with a vertical cylinder nanostructure, lithium ions may be able to flow from one electrode to another in a straight, one dimensional fashion. This straight one dimensional flow may result in a low or no tortuosity architecture that is ideal for the mass transport of lithium ions. Other benefits of producing separator 204 with block copolymers may be low ionic resistance, lower all-over cell impedance, lower temperature increase during charging/discharging, potentially longer cycle life, more homogeneous current distribution across electrode areas, and the like. Tortuosity can be a measure of the relative ionic conduction pathway length, represented as tau ($\tau$); it is calculated as the product of porosity and MacMullin Number ($\varepsilon$NM). A lower tortuosity typically correlates with lower ionic resistance within porous electrodes (measured in ohms ($\Omega$)). Lower tortuosity may also, therefore, be correlated with a lower maximum cell temperature increase during charging (when the anode is being lithiated). Another benefit is that the overall thickness of separator 204 may be between 8 micron to 30 microns. Because of the vertical cylinder nanostructure, separator 204 may be relatively thick (e.g. 25-30 microns) and still may achieve low or no tortuosity, which may be particularly useful in EV applications. In one embodiment, separator 204 may be formed during the electrolyte wetting stage of a Li-ion battery assembly. During the electrolyte wetting stage, one or more pores within separator 204 are filled with an electrolyte. Subsequent to the electrolyte wetting stage, a cell may be sealed and initially charged.

In addition, separator 204 may be implemented in many other devices such as Li-ion batteries in mobile devices. Such mobile devices may require a relatively thin separator (e.g. 8-10 micron). Traditionally, a separator's thicknesses may be reduced in an attempt to improve tortuosity within a cell. However, making a separator too thin (e.g., 6 micron) may result in an internal short within the cell. Such an internal short may cause catastrophic events such as cell failure or cell explosion. The nanostructure of separator 204 may allow for low or no tortuosity without reducing a separator to a dangerous level (e.g., 6 micron).

Figure 3:
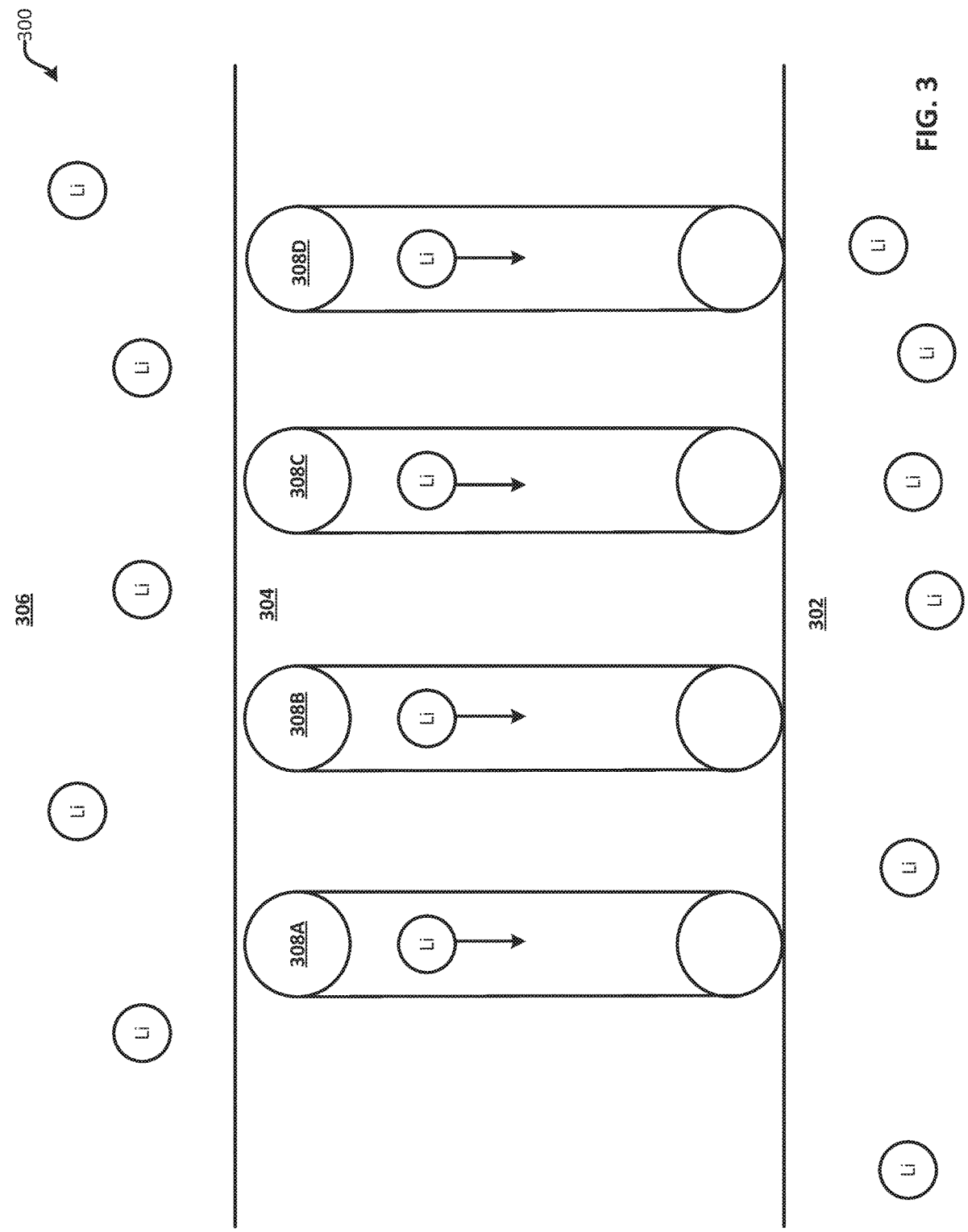
FIG. 3 illustrates a third battery cell in accordance with one or more embodiments.

FIG. 3 illustrates cell 300 that may be implemented by one or more embodiments. Cell 300 comprises cathode 302, separator 304 and anode 306. Cathode 302 and anode 306 may contain one or more lithium ions. The lithium ions may move between cathode 302 and anode 306. Separator 304 may be a microporous insulator that physically separates cathode 302 and anode 306. Separator 304 may comprise one or more vertical cylinders 308A-308D. Each vertical cylinder may represent a pore within separator 304. Each vertical cylinder may be a pathway through which a lithium ion may move between cathode 302 and anode 306. Separator 304 may be comprised of one or more block copolymers that may self-assemble (or otherwise assemble) into a vertical cylinder nanostructure. The vertical cylinder nanostructure may allow a one dimensional route between cathode 302 and anode 306. The one dimensional route may create a low or no touristy architecture for the lithium ions within cell 300. In one embodiment, lithium ions may only be transmitted between cathode 302 and anode 306 via one or more vertical cylinders 308A-308B. Although only four vertical cylinders are shown it is possible for separator 304 to contain many more vertical cylinders for transporting lithium ions.

Figure 4:
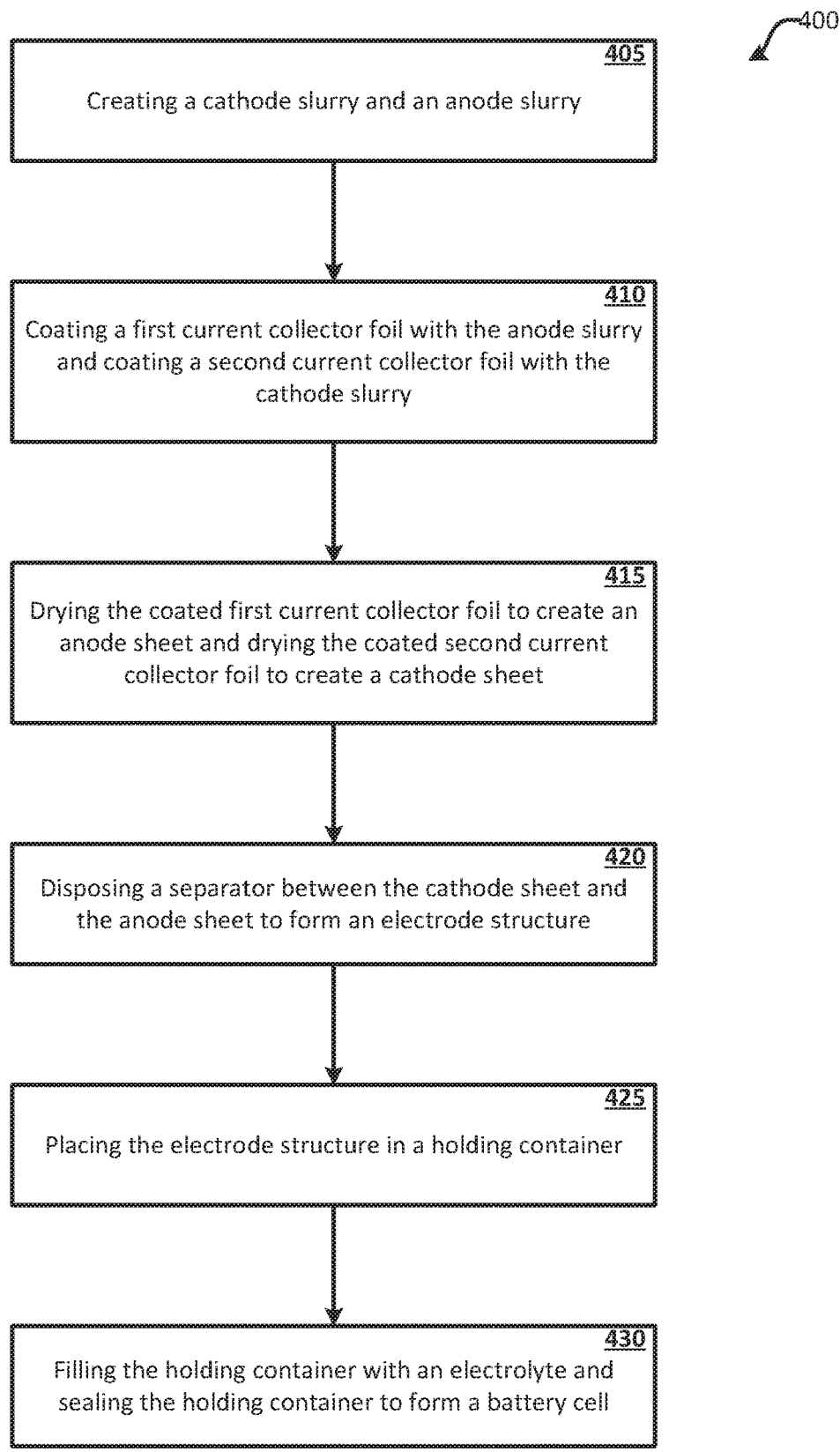
FIG. 4 illustrates a battery manufacturing process in accordance with one or more embodiments.

FIG. 4 illustrates process 400 for manufacturing a cell according to one or more embodiments. Process 400 may involve one or more manufacturing devices such as a slurry machine, foil coating machine, drying machine, one or more large reels and the like. At 405, a cathode slurry and an anode slurry are created. In one embodiment, the materials that make up a cathode and/or an anode may be received (e.g., at a manufacturing facility) in the form of a powder. For example, a cathode powder may be a powder form of $LiCoO_2$ or $LiFePO_4$. In another example, an anode powder may be a powder form of carbon (graphite). In one embodiment, the structural make up of an electrode powder may alter the electrical or chemical characteristics of the electrode. For example, electrode powders that contain particles with smooth spherical shapes and rounded edges may be ideal as electrode powders that contain particles with sharp or flakey surfaces may be susceptible to higher electrical stress and decomposition. Electrical stress and decomposition may lead to possible thermal runway when the electrode is in use within a cell. The cathode powder may be mixed with a conductive binder to form a cathode slurry. Similarly, the anode powder may be mixed with a conductive binder to form an anode slurry.

At 410, the anode slurry is coated onto a first current collector foil and the cathode slurry is coated onto a second current collector foil. The first current collector foil may be a foil that is specific to an anode slurry. For example, the first current collector foil may be a copper foil, nickel foil, or the like. The second current collector foil may be a foil that is specific to a cathode slurry. For example, the second current collector foil may be an aluminum foil and the like. Each current collector foil may be delivered by large reels and may be fed into separate coating machines. While in separate coating machines, each current collector foil has a corresponding slurry that is spread on its surface. For example, the first current collector foil may be fed, by a large reel, into an anode coating machine. While in the anode coating machine, the anode slurry produced at 405 may be spread on the surface of the first current collector foil as the first current collector foil passes through the anode coating machine. During the coating process, the thickness of a coated current collector foil may be modified such that the coated current collector foil has a desired thickness. In one embodiment, the thickness of the coated current collector foil may alter the energy storage per unit area of an electrode that is formed from that coated current collector foil.

At 415, the coated first current collector foil and the coated second current collector foil are dried. The coated current collector foils may be dried by feeding the coated current collector foils into a drying oven. Inside the drying oven, the respective electrode material (e.g., cathode or anode slurry) may be baked onto the coated current collector foil. Once the electrode material is baked onto a coated current collector foil, the coated current collector foil may be cut (e.g., width wise) into a size desired for a particular application. At the end of 415, an anode sheet may be formed from the processing applied to the first current collector foil and a cathode sheet may be formed from the processing applied to the second current collector foil. In one embodiment, the thickness of the cathode sheet and anode sheet is determined at 410 and the width of the cathode sheet and anode sheet is determined at 415.

At 420, a separator is disposed between the cathode sheet and the anode sheet forming an electrode structure. The separator may be a microporous insulator. In one embodiment, a separator may be disposed between the cathode sheet and anode sheet in a prismatic cell structure. In a prismatic cell structure, the cathode and anode sheets are cut into individual electrode plates and the separator is placed in the middle of the electrode plates. In one embodiment, the separator may be applied as a single long strip in a zig zag fashion. In such an embodiment, the separator would be woven in between alternate electrodes in the stack. For example, a first layer in the prismatic cell may be a first cathode sheet, the second layer may be a separator, the third layer may be a first anode sheet, the fourth layer may be the separator, the fifth layer may be a second cathode sheet, the sixth layer may be the separator, the seventh layer may be a second anode sheet, and so forth. This stacked configuration may be used for high capacity battery applications to optimize space.

In one embodiment, a separator may be disposed between the cathode sheet and anode sheet in a cylindrical cell structure. In a cylindrical cell structure, the cathode sheet, the separator, and the anode sheet are wound onto a cylindrical mandrel in such a way that the cathode sheet and anode sheet are separated by the separator. The result of this winding process is a jelly roll. An advantage of the cylindrical cell structure is that it requires only two electrode strips which simplifies the construction process over other structures (e.g., prismatic cell). A first tab may be included on the cathode sheet and a second tab may be included on the anode sheet. Each respective tab may be a connection point to the respective electrode (e.g., to connect to an external device).

In one embodiment, the separator may be disposed on the cathode sheet or anode sheet by spin coating (or coating by other means) one or more block copolymers onto the cathode or anode sheet in a solvent system (e.g., a system comprising one or more solvents). Once the solvent evaporates, the block copolymers may self-assemble form a nanostructure and this nanostructure may act as the separator. In one embodiment, the separator produced via one or more block copolymers may be produced by spin coating a surface (e.g., a surface that is not part of the cathode sheet or anode sheet) in a solvent system. Once the solvent evaporates, the block copolymers may self-assemble into a nanostructure. The nanostructure may then be peeled from the surface and implemented as a separator in one or more cell structures (e.g., cylindrical cell structure, prismatic cell structure, and the like) along with the cathode sheet or anode sheet. Once the separator has been disposed between the cathode and anode an electrode structure is formed.

At 425, the electrode structure is placed in a holding container. The holding container may depend upon the cell structure of the electrode structure. For example, a holding container may be a can-shaped container for a cylindrical cell structure. At 430, once the electrode structure is inside the holding container the holding container is filled with an electrolyte and sealed. The filling of the holding container with the electrolyte may be referred to as an electrolyte wetting process. After the holding container is sealed the battery cell is formed. Once the battery cell is formed the battery cell may be charged and discharged once to activate the materials (e.g., cathode, anode, lithium ions, etc.) inside the battery cell to make the battery cell active.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed:

1. A battery cell comprising:
 a cathode layer;
 an anode layer; and
 a separator layer positioned between the cathode layer and the anode layer, wherein the separator layer comprises one or more block copolymers, wherein the one or more block copolymers in the separator layer comprise a 1:3 ratio of acrylonitrile and polystyrene, respectively.

2. The battery cell of claim 1, wherein the separator layer comprises one or more pores and at least one pore of the one or more of the pores has a vertical cylinder nanostructure.

3. The battery cell of claim 2, wherein the vertical cylinder nanostructure has a diameter between 1 nanometer and 100 nanometers.

4. The battery cell of claim 1, wherein the separator layer has a thickness of 8 microns to 30 microns.

5. The battery cell of claim 1, wherein the one or more block copolymers in the separator layer comprise acrylonitrile.

6. The battery cell of claim 1, wherein the one or more block copolymers in the separator layer comprise polystyrene.

7. The battery cell of claim 1, wherein the battery cell is a lithium ion battery cell.

8. The battery cell of claim 1, wherein the anode layer comprises carbon.

9. The battery cell of claim 1, wherein the battery cell is a solid state battery cell.

10. A method of producing a lithium ion battery cell, comprising:
 placing a separator layer between a cathode layer and an anode layer, wherein:
  the separator layer comprises one or more block copolymers; and
  the one or more block copolymers in the separator layer comprise a 1:3 ratio of acrylonitrile and polystyrene, respectively.

11. The method of claim 10, wherein the separator layer comprises one or more pores and at least one pore of the one or more of the pores has a vertical cylinder nanostructure.

12. The method of claim 11, wherein the vertical cylinder nanostructure has a diameter between 1 nanometer and 100 nanometers.

13. The method of claim 10, wherein the separator layer has a thickness of 8 microns to 30 microns.

14. The method of claim 10, wherein the separator layer further comprises acrylonitrile.

15. The method of claim 10, wherein the separator layer further comprises polystyrene.

16. The method of claim 10, wherein the battery cell is a lithium ion battery cell.

17. The method of claim 10, wherein the anode layer comprises carbon.

18. The method of claim 10, wherein the battery cell is a solid state battery cell.

* * * * *